April 11, 1944. A. C. DURDIN, 3D 2,346,366
MECHANICAL AERATOR
Filed Dec. 29, 1941
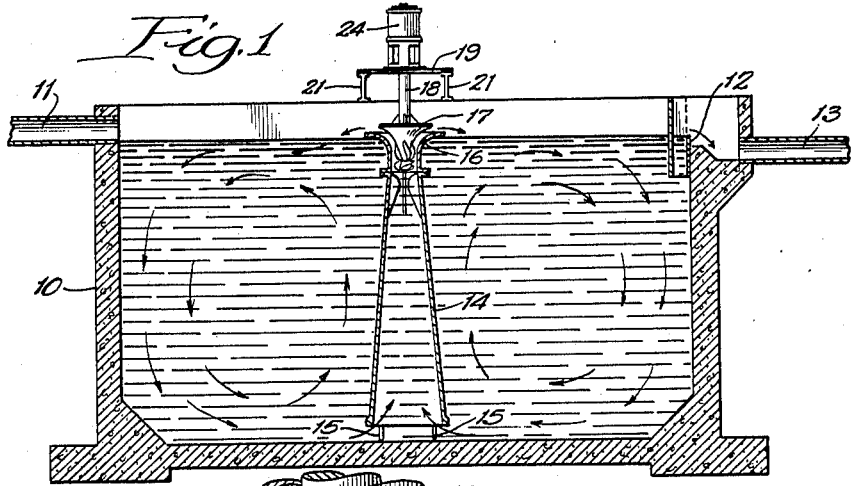
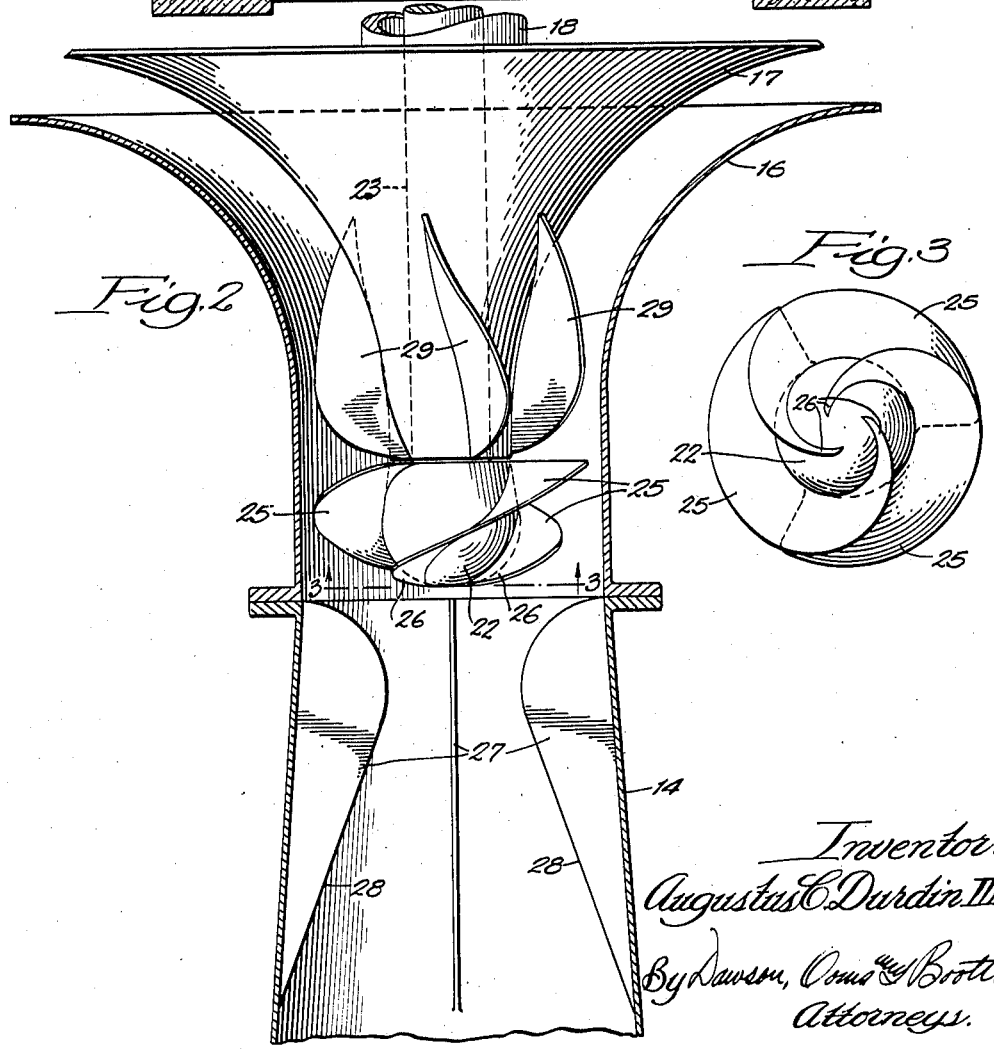

Patented Apr. 11, 1944

2,346,366

UNITED STATES PATENT OFFICE 2,346,366

MECHANICAL AERATOR

Augustus C. Durdin, III, Skokie, Ill., assignor of twenty-four per cent to Lewis H. Durdin, Franklin, Pa., and fifty-two per cent to Augustus C. Durdin, Jr., Chicago, Ill.

Application December 29, 1941, Serial No. 424,707

4 Claims. (Cl. 259—97)

This invention relates to mechanical aerators and more particularly to mechanism for aerating and circulating a liquid mixture such as sewage.

One of the objects of the invention is to provide a mechanical aerator which is highly efficient to circulate the maximum volume of liquid for the minimum power input. According to one feature of the invention, this is accomplished by providing guide and reactance vanes cooperating with a vaned pump wheel to cause a smooth flow of liquid at optimum pressure and velocity conditions.

Another object of the invention is to provide a mechanical aerator which will not become fouled by fibrous or like material in the liquid. Preferably, the apparatus is so designed as to be self cleaning, so that it may be operated substantially indefinitely without attention.

The above and other objects and advantages of the invention will be more readily apparent from the following description when read in connection with the accompanying drawing, in which:

Figure 1 is a section of a sewage aeration tank embodying the invention;

Figure 2 is an enlarged section with parts in elevation of the pump and guide vane mechanism; and Figure 3 is a partial plan view on the line 3—3 of Figure 2.

In Figure 1, there is shown a sewage aeration tank comprising a tank 10 having an influent conduit 11 through which settled sewage and return sludge may enter the tank. Effluent from the tank flows over a weir 12, out an effluent conduit 13, which may conduct it to any desired point for further treatment, or for disposal.

Centrally within the tank, there is arranged a vertical draft tube 14 supported on legs 15 at the bottom of the tank, so as to be open for the inlet of liquid from the tank thereto. The upper end of the draft tube is flared at 16 to provide an annular outlet above the level of liquid in the tank. The annular outlet is defined between the flared portions 16 of the tube and a reaction cone 17, fixedly supported in the flared end of the tube and spaced from the walls thereof. The cone 17 is carried by a supporting tube 18, depending from a platform 19 carried by cross beams 21 extending across the tank.

At the lower end of the cone there is rotatably mounted a hub 22, shown as having a rounded inlet end and being of circular cross section. The hub is carried by and may be driven by a shaft 23 extending through the cone 17 and driven by a motor 24 supported on the platform 19. The hub 22 carries a plurality of vanes 25, three being shown, each starting with a narrow inlet portion as shown at 26 on the rounded inlet part of the hub and tapering outwardly in width on a spiral about the hub to a maximum diameter less than the adjacent diameter of the tube 14. The vanes are so shaped as to have a greater lift adjacent their outer edges than close to the hub, so that in operation, a flow of liquid across the surfaces of the vanes will be produced to wipe from the vanes any material tending to adhere thereto. This construction, coupled with the spiral inlet edge of the vanes, makes them substantially self-cleaning, any material tending to collect on the vanes being able to pass between the outer edges of the vanes and the tube.

At the inlet side of the hub, there is provided in the tube a series of guide vanes 27 extending radially inward from the wall of the tube and having a tapered inlet edge 28 of such a gradual taper that any material tending to collect thereon will slide along the edge and free of the vanes. The vanes increase gradually in thickness to a maximum adjacent their outlet ends, which is such as to provide an unobstructed central passage in the tube of substantially the same diameter as the hub 22.

At the outlet side of the hub and on the outer surface of the reaction cone 17, there are secured a series of reactance vanes 29, spiralling outwardly in width from their inlet edges and curved about the surface of the cone. These vanes are arranged at such an angle as to receive fluid discharged by the vanes 25 smoothly and with a minimum of shock. Due to the tapered inlet edges, material does not tend to collect on the vanes 29 and they are further preferably so shaped as to provide different angles at different radii to produce circulation across their faces from the center out, in order to scrub therefrom any material tending to collect thereon. The width of the vanes is such that their outer edges are spaced from the draft tube so that any fibrous or like material collecting on the vane edges may pass between the vanes and the tube wall.

In operation, with the hub 22 rotating, liquid will be drawn in the open bottom end of the tube and will pass upwardly therethrough. The guide vanes 27 direct the liquid axially into the vanes 25, which pick it up and discharge it with a spiral motion into the reactance vanes 29. These vanes pick up the liquid smoothly and direct it along the reaction cone, through the annular passage between the cone and the flared end of the tube, so that the liquid is discharged from the annular passage between the cone and tube with the desired velocity and pressure head.

Any solid or fibrous material carried by the liquid will slide over the edges of the several sets of vanes and will pass freely through the unit without being tangled therein. Furthermore, any such material tending to collect on the faces of the pump vanes 25 or reactance vanes 29 will be washed therefrom by the sweep of the liquid across the faces of these vanes. Thus the unit is substantially self-cleaning and may be operated for long periods without attention.

While one embodiment of the invention has been shown and described in detail, it will be understood that this is illustrative only and is not to be taken as a definition of the scope of the invention, reference being had for this purpose to the appended claims.

What is claimed is:

1. A mechanical aerator comprising a tube for fluid flow flared at its outlet end, a reaction cone mounted in the flared outlet end and spaced from the walls thereof, a hub rotatable adjacent the inlet end of the reaction cone, a fluid propulsion vane on the hub, and a reactance vane on the cone to receive fluid from the propulsion vane and direct it along the cone, the reactance vane being supported solely by the cone and having its outer edge spaced from the walls of the tube, and being so shaped as to present a different angle adjacent the cone than adjacent its outer edge so as to provide a circulation outwardly across the surface of the vane.

2. A mechanical aerator comprising a tube for fluid flow flared at its outlet end, a reaction cone mounted in the flared outlet end and spaced from the walls thereof, a hub rotatable adjacent the inlet end of the reaction cone, a fluid propulsion vane on the hub, and a reactance vane on the cone to receive fluid from the propulsion vane and direct it along the cone, the reactance vane being supported solely by the cone and tapering in width from its inlet end to a maximum width spaced from its inlet end such as to leave its outer edge spaced from the tube.

3. A mechanical aerator comprising a tube for fluid flow flared at its outlet end, a reaction cone mounted in the flared outlet end and spaced from the walls thereof, a hub rounded at its inlet end and mounted for rotation at the inlet end of the cone, a spiral vane on the hub tapering in width from its inlet edge to a maximum diameter less than the diameter of the tube, a series of guide vanes in the tube at the inlet side of the hub tapering in width from their inlet ends to a maximum such as to leave a central free space in the tube aligned with the hub, and a series of reactance vanes on the cone tapered in width from their inlet edges to a maximum width such as to leave a free space between the vanes and the tube wall.

4. A mechanical aerator for use with a tank adapted to contain sewage or the like comprising a vertical tube in the tank and open at its bottom to receive liquid from the tank and terminating in a flared outlet end above the liquid in the tank, a reaction cone fixedly mounted in the flared outlet and spaced from the walls thereof, a hub rounded at its inlet end and mounted for rotation at the inlet end of the cone, a spiral vane on the hub tapering in width from its inlet edge to a maximum diameter less than the diameter of the tube, a series of guide vanes in the tube at the inlet side of the hub tapering in width from their inlet ends to a maximum such as to leave a central free space in the tube aligned with the hub, and a series of reactance vanes on the cone tapered in width from their inlet edges to a maximum width such as to leave a free space between the vanes and the tube wall.

AUGUSTUS C. DURDIN, III.